United States Patent
Kucera et al.

(10) Patent No.: US 12,467,692 B2
(45) Date of Patent: Nov. 11, 2025

(54) FLAME ANALYTICS SYSTEM

(71) Applicant: Honeywell International Inc., Charlotte, NC (US)

(72) Inventors: David Kucera, Bilovice nad Svitavou (CZ); Curtis Taylor, Paradise Valley, AZ (US); Jonathan McDonald, Shakopee, MN (US); Gregory Stewart, North Vancouver (CA); Wyatt Culler, Berne, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 40 days.

(21) Appl. No.: 18/397,833

(22) Filed: Dec. 27, 2023

(65) Prior Publication Data
US 2024/0125554 A1    Apr. 18, 2024

Related U.S. Application Data

(63) Continuation of application No. 16/665,572, filed on Oct. 28, 2019, now Pat. No. 11,898,800.
(Continued)

(51) Int. Cl.
*F23N 5/24* (2006.01)
*F23N 5/16* (2006.01)
(Continued)

(52) U.S. Cl.
CPC ............ *F27D 21/04* (2013.01); *F23N 5/16* (2013.01); *F23N 5/242* (2013.01); *G06F 16/219* (2019.01);
(Continued)

(58) Field of Classification Search
CPC ............ F27D 21/04; F27D 2021/0057; F27D 2021/026; G06F 16/219; G06N 20/00;
(Continued)

(56) References Cited

U.S. PATENT DOCUMENTS

| 4,306,451 A | 12/1981 | Szonntagh |
| 4,780,597 A * | 10/1988 | Linhart ................ F24C 15/166 |
| | | 219/403 |

(Continued)

FOREIGN PATENT DOCUMENTS

| CN | 105678295 A | 6/2016 |
| RU | 2656670 C1 | 6/2018 |

(Continued)

OTHER PUBLICATIONS

International Search Report and Written Opinion for International Application No. PCT/US2019/059461, dated Jan. 30, 2020. (7 pages).

(Continued)

*Primary Examiner* — Avinash A Savani
(74) *Attorney, Agent, or Firm* — Seager, Tufte & Wickhem, LLP

(57) ABSTRACT

A flame analytics system that may incorporate a burner, one or more sensors at the burner, a historical database connected to the one or more sensors, a model training module connected to the historical database, and a runtime algorithm module connected to the one or more sensors and the model training module. The runtime algorithm may compare real-time data from the one or more sensors and historical data from the model training module in accordance with a machine learning algorithm. The system may further incorporate a fault detection module connected to the runtime algorithm module, a fault diagnostics module connected to the fault detection module, and an enunciator connected to the fault detection module. The one or more sensors may also include having video or acoustic sensitivity of combustion in the burner.

18 Claims, 8 Drawing Sheets

Related U.S. Application Data

(60) Provisional application No. 62/755,297, filed on Nov. 2, 2018.

(51) Int. Cl.
| | | |
|---|---|---|
| *F27D 21/04* | (2006.01) | |
| *G06F 16/21* | (2019.01) | |
| *G06N 5/02* | (2023.01) | |
| *G06N 5/04* | (2023.01) | |
| *G06N 20/00* | (2019.01) | |
| *F27D 21/00* | (2006.01) | |
| *F27D 21/02* | (2006.01) | |

(52) U.S. Cl.
CPC .............. *G06N 5/02* (2013.01); *G06N 5/04* (2013.01); *G06N 20/00* (2019.01); *F23N 2223/04* (2020.01); *F23N 2223/08* (2020.01); *F23N 2223/36* (2020.01); *F23N 2223/48* (2020.01); *F23N 2229/00* (2020.01); *F23N 2241/04* (2020.01); *F23N 2900/05006* (2013.01); *F27D 2021/0057* (2013.01); *F27D 2021/026* (2013.01)

(58) Field of Classification Search
CPC .... G06N 5/02; G06N 5/04; F23N 5/16; F23N 5/242; F23N 2223/08; F23N 2223/48; F23N 2223/36; F23N 2223/04; F23N 2229/00; F23N 2900/05006
USPC .......................................................... 431/13
See application file for complete search history.

(56) References Cited

U.S. PATENT DOCUMENTS

| | | |
|---|---|---|
| 4,882,573 A | 11/1989 | Leonard et al. |
| 5,249,954 A | 10/1993 | Allen et al. |
| 5,971,747 A | 10/1999 | Lemelson et al. |
| 6,006,167 A | 12/1999 | Bunting |
| 7,610,252 B2 * | 10/2009 | Wintrich .............. G05B 13/042 706/45 |
| 8,993,966 B2 | 3/2015 | Cole |
| 9,657,946 B2 | 5/2017 | Young et al. |
| 2007/0072137 A1 | 3/2007 | Peluso et al. |
| 2011/0094238 A1 * | 4/2011 | Mosley ..................... F02C 9/28 60/773 |
| 2013/0006581 A1 | 1/2013 | Singh et al. |
| 2013/0279803 A1 * | 10/2013 | Cetin ..................... G06V 20/52 382/165 |
| 2014/0047284 A1 | 2/2014 | Masleid et al. |
| 2014/0162199 A1 | 6/2014 | Abrol |
| 2015/0159867 A1 * | 6/2015 | Patrick .................. F23M 11/00 702/182 |
| 2015/0316262 A1 | 11/2015 | Immer et al. |

FOREIGN PATENT DOCUMENTS

| | | |
|---|---|---|
| WO | 2014047284 A1 | 3/2014 |
| WO | 2017058832 A1 | 4/2017 |

OTHER PUBLICATIONS

Extended European Search Report, European Patent Office, EP Application No. 19198800308.2, dated Jun. 10, 2022. (9 pages).

* cited by examiner

FLAME ANALYTICS SYSTEM

This is a continuation of co-pending U.S. patent application Ser. No. 16/665,572, filed Oct. 28, 2019, which claims the benefit of U.S. Provisional Patent Application Ser. No. 62/755,297, filed Nov. 2, 2018, both of which are incorporated herein by reference.

BACKGROUND

The present disclosure pertains to detection of faults in combustion systems.

SUMMARY

The disclosure reveals a flame analytics system that may incorporate a burner, one or more sensors at the burner, a historical database connected to the one or more sensors, a model training module connected to the historical database, and a runtime algorithm module connected to the one or more sensors and the model training module. The runtime algorithm may compare realtime data from the one or more sensors and historical data from the model training module in accordance with a machine learning algorithm. The system may further incorporate a fault detection module connected to the runtime algorithm module, a fault diagnostics module connected to the fault detection module, and an enunciator connected to the fault detection module. The one or more sensors may also include having video or acoustic sensing of combustion in the burner.

DESCRIPTION

Figure 1:
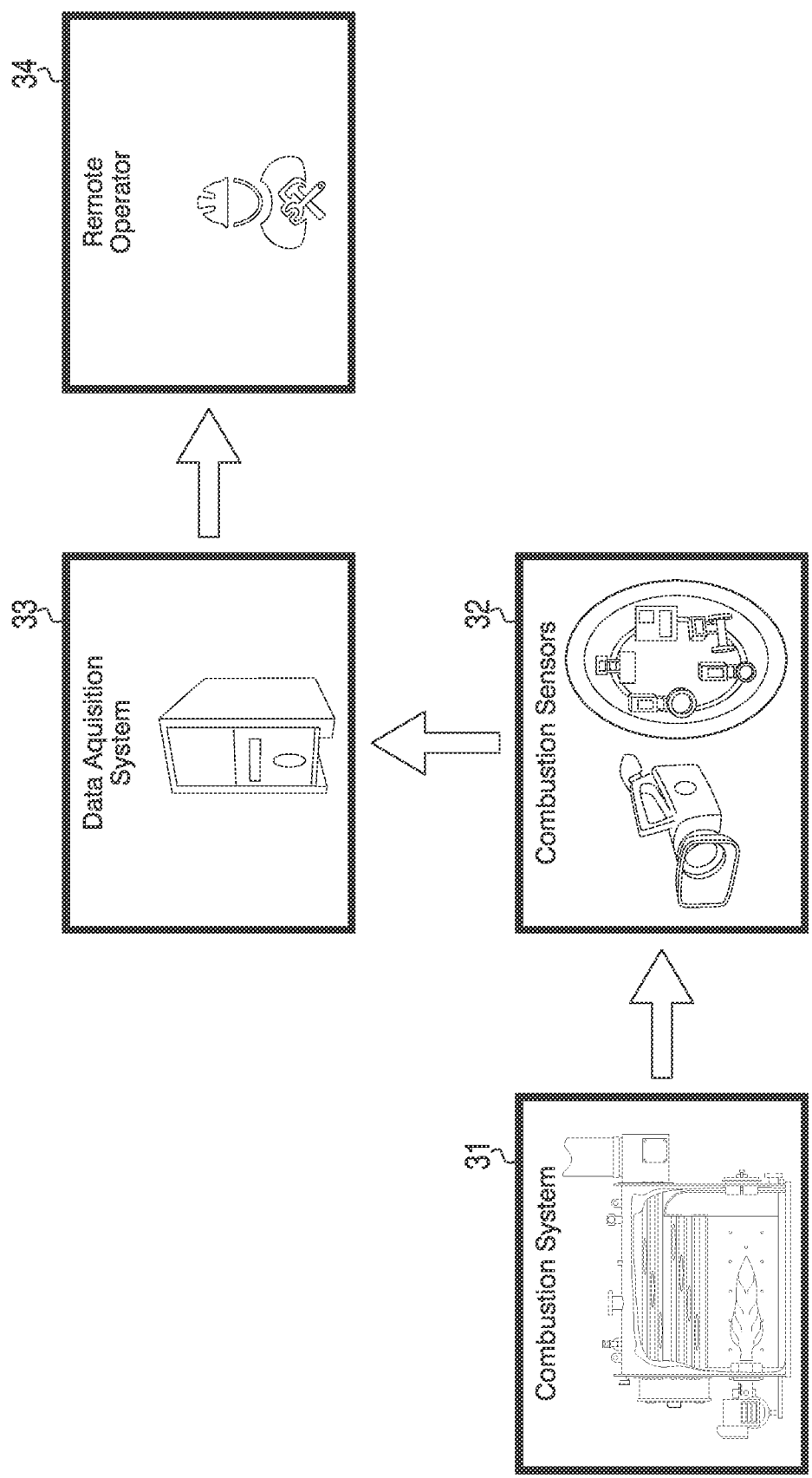
FIG. 1 is a diagram of a process block.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Related art combustion systems may implement only limited continuous monitoring of burner performance. A typical approach to address down-time is "fix it when it breaks". Lack of preventive maintenance methods may have the following consequences. Key parameters such as CO/NOx are generally only checked against specification during commissioning, and may subsequently drift during normal operation, thereby violating emissions regulations. The fuel/air ratio may drift over time and result in poor efficiency, high emissions or deterioration of components. Dirty applications such as glass furnaces may frequently deal with plugged burner nozzles. If operating outside a tight performance window, thermal hotspots may develop on burner components or chamber walls leading to early life failures. Flame instability (e.g., resonance) may lead to a nuisance shutdown/premature failure. Minimizing the amount of nuisance shutdowns and other unplanned downtime is another significant value proposition to customers, and this is uniquely accomplished using the continuous monitoring of burner performance.

Also, in appliances which cannot necessarily use a conventional sensor to provide combustion quality feedback (such as an O2 sensor), alternative sensing approaches may be needed to keep combustion stable under varying conditions. In applications with multiple burners this combustion quality feedback can help to make sure that all burners are operating optimally. Finally, such combustion quality feedback may also simplify or improve the accuracy of burner commissioning, and potentially replace traditional flame safeguards to detect a flame-out situation within safety time, e.g., one second.

Instead of individual measurements of a physical characteristic at a single location (e.g., flame UV signal sensed by an individual UV tube, flue gas temperature, air and gas mass flows entering the burner, and so on), advanced flame analytics based on 2D/3D data, combined with other sensing and system information, may have the potential to provide a larger wealth of useful diagnostics information not necessarily possible with existing techniques.

The present approach may reduce down-time, provide more accurate contextual information for maintenance, and speed up commissioning. The approach may also help increase combustion efficiency and minimize emissions. The approach may also improve quality of an end product, for example, by providing data used to improve furnace temperature homogeneity and/or improve heat transfer from the flame to an end product (e.g., molten glass).

The following items may be some examples of how the analytics results may be used. 1) There may be monitoring with automated detection of combustion issues. A better detection of a flame state may provide humans with early and higher fidelity detection of subtler issues before they become a large issue. The technical issue may amount to defining "normal", and detecting and isolating deviations from that normal. The offering may be in a form of a software system that alerts human users. For example, "an image around burner #7 looks unusual" and may be "accompanied by a stronger acoustic signal at a known resonant frequency". The alerting can be either 1a) anomaly detection (something is different), or 1b) fault diagnosis—"the current pattern of signals indicates that burner #3 has a 60 percent probability of being partly plugged". 2) There may be active control from image/acoustic data. For example, connecting image or acoustic and traditional sensing through a feedback algorithm may be used to automatically trim air-fuel ratio (AFR) to stabilize combustion.

A camera/sensor capable of monitoring the flame with anomaly detection may be mounted on a combustion appliance such that it has a view of the flame. One such location may be the flame site port on a boiler. A signal from multiple sensors may be combined, each sensor having a substantially different viewing angle of the flame to allow reconstructing flame shape in 3D and/or to distinguish individual flames in a multi-burner appliance, and/or distinguish a flame from its background.

The sensor/camera may be sensitive in various electromagnetic spectra (e.g., visible light/UV/IR). A signal from multiple sensors may be combined, each sensing in a substantially different interval of the electro-magnetic spectrum. Some sensors may be only sensitive in a narrow spectral band to sense flame radiation corresponding to, e.g., absorption of CO2 or water vapor molecules.

A 2D/3D video signal may be processed by image processing techniques to measure flame size, characterize flame shape, detect hot spots, detect flame oscillations/fluctuations/flicker and/or measure its fundamental frequency.

Flame video analytics may be combined with data points available in the system control, such as operational state, firing rate, readings from other sensors (temperature, pressure, flow, valve percentage opening, O2, and so on). This combination may increase the accuracy of flame diagnostics and the list of actions recommended to the user.

Flame video analytics may also be combined with data points not traditionally available, such as an audio signal from a microphone located to sense audio signal substantially from the flame and minimize the noise picked up from the surroundings.

The analytics algorithms may be created/tuned by using representative training sets with data labeled by experts based on system control data. Alternatively, non-labeled training sets may be used, in combination with self-learning algorithms. Training sets may contain data from situations such as an optimal fuel/air ratio, fuel-rich flame, fuel-lean flame, high firing rate, low firing rate, varying gas quality, flame with hot spots, flame with increased emissions, and so forth.

An arrangement in a diagram of FIG. 1 shows a version of the present system. The system may have one or more industrial or non-industrial burners. A burner system 31 of FIG. 1 may be instrumented with combustion sensors 32, which include conventional sensors such as for temperatures, flows and so forth, and optionally with advanced sensors such as acoustic and/or video sensors. Data collected from sensors 32 may be transmitted to a data acquisition system (DAQ) 33, which may or may not be on site. The data may then be processed by a machine learning algorithm. Results such as any detected faults may be sent to a receiving station or an operator 34 for decisions or action.

Figure 2:
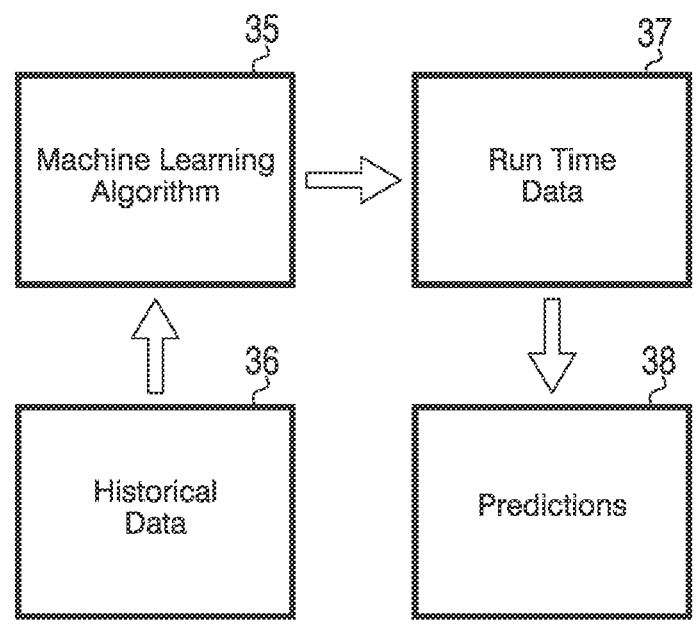
FIG. 2 is a diagram of a machine learning algorithm.

FIG. 2 is a diagram that shows a version of a machine learning algorithm 35. Historical data 36, saved on DAQ 33, may be used to train the machine learning algorithm 35. Once machine learning algorithm 35 is trained, algorithm 35 may be applied to nm time data 37, which are used as predictor variables. The nm time data 37 may be used to generate predictions 38 based on historical training data 36. If predictions 38 differ from the measured variables by more than a certain threshold, an alarm may be issued. Once such learning algorithm is advanced pattern recognition (APR), which is used to detect when runtime data statistically deviates from the data that the model was trained on.

Figure 3:
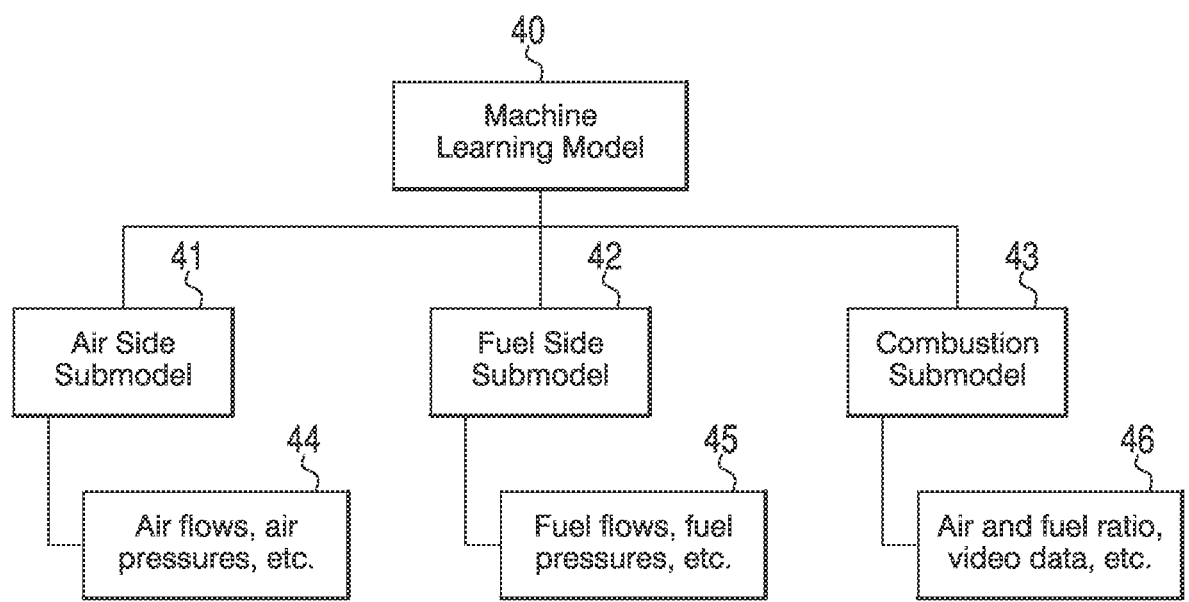
FIG. 3 is a diagram of machine learning submodels.

FIG. 3 is a diagram of a version of a machine learning model 40 that may incorporate or be connected to multiple submodels for different combustion system actions, such as an air side submodel 41, a fuel side submodel 42 and a combustion submodel 43, which are for combustion processes, respectively, indicated in block 44 of air flow, air pressures and so forth, in block 45 of fuel flows, fuel pressures and so forth, and in block 46 of air and fuel ratio, video data, and so forth. Creating a submodel for each combustion process may allow faults to be better isolated.

Figure 4:
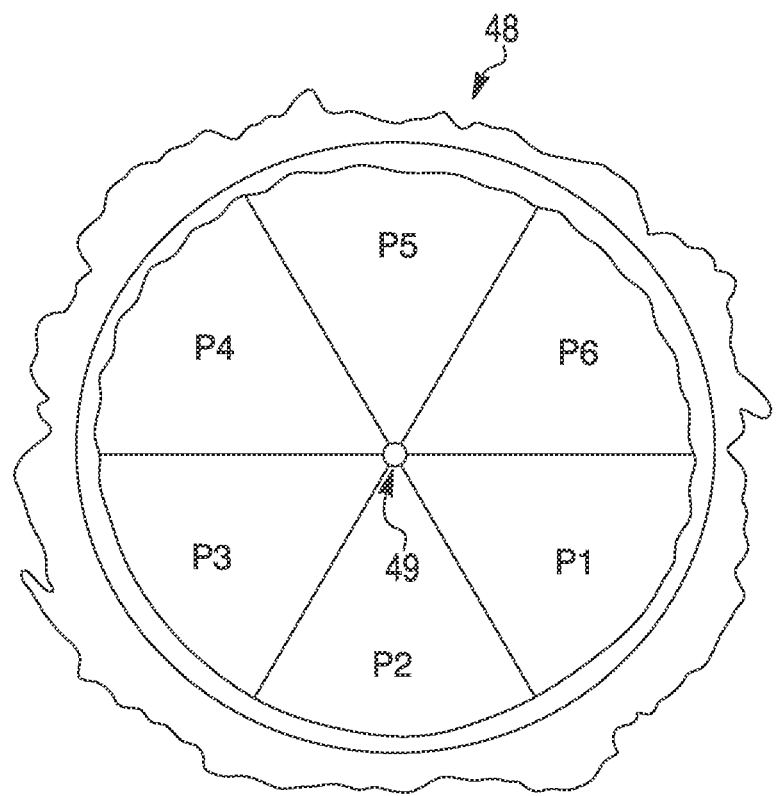
FIG. 4 is a diagram of an example segmented image.

Video data may require post-processing before machine learning techniques are applied to the data. FIG. 4 is a diagram of an approach of post-processing an image by using automatic segmentation. First, an image 48 may be binarized using some combination of the pixel values in each color channel. Binary image 48 may then be divided into different geometric regions having a common point 49. The regions may or may not have equal areas. Different statistical measures, such as averages or standard deviations between the pixel values for each channel may be created for each segment of the color image. These measures may be used in the machine learning models.

Figure 5:
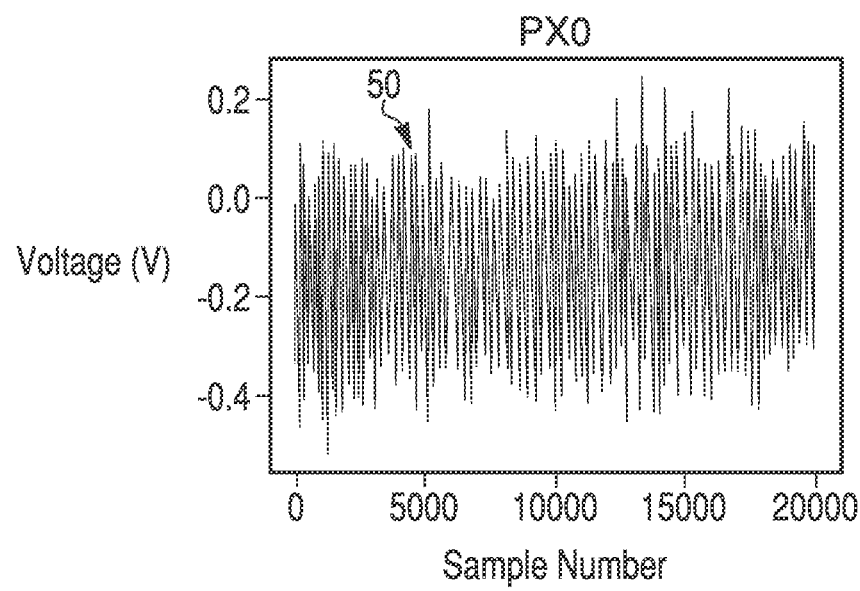
FIG. 5 is an example raw acoustic signal.
Figure 6:
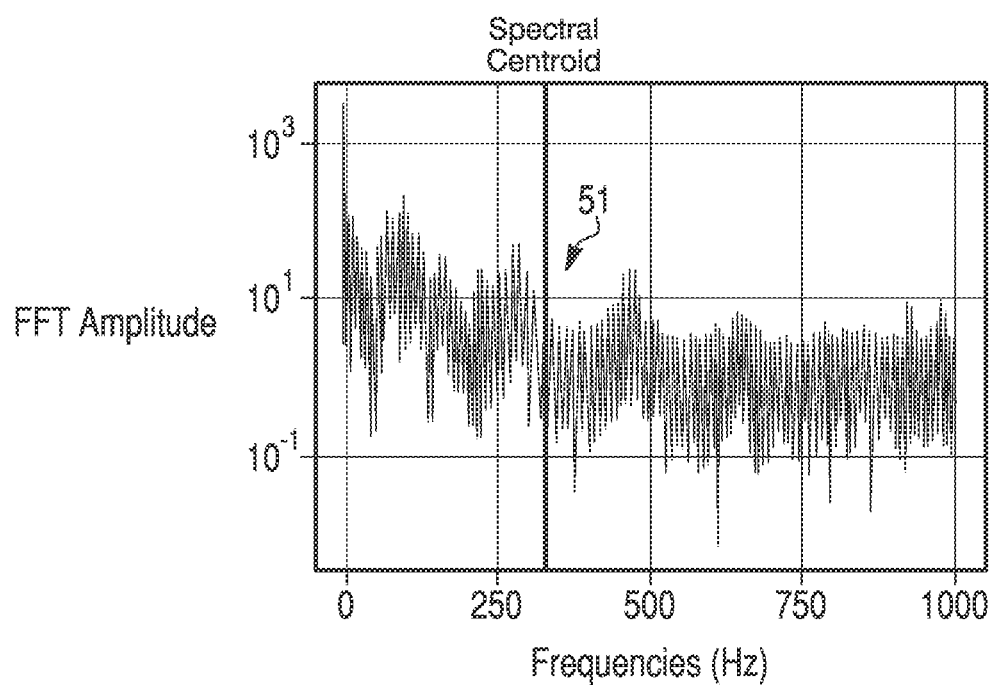
FIG. 6 is a diagram of an example acoustic spectra with an example feature highlighted (spectral centroid)

Acoustic data may require post-processing before machine learning techniques are applied to it. FIG. 5 is a diagram that shows a raw acoustic signal measurement 50, while FIG. 6 is a diagram that shows one such approach of post-processing acoustic data. First, a frequency space transform is applied to the raw acoustic data. Many metrics may be extracted from the frequency space transform. One such metric may be a spectral centroid 51, which represents the center-of-mass of a frequency spectrum.

Figure 9:
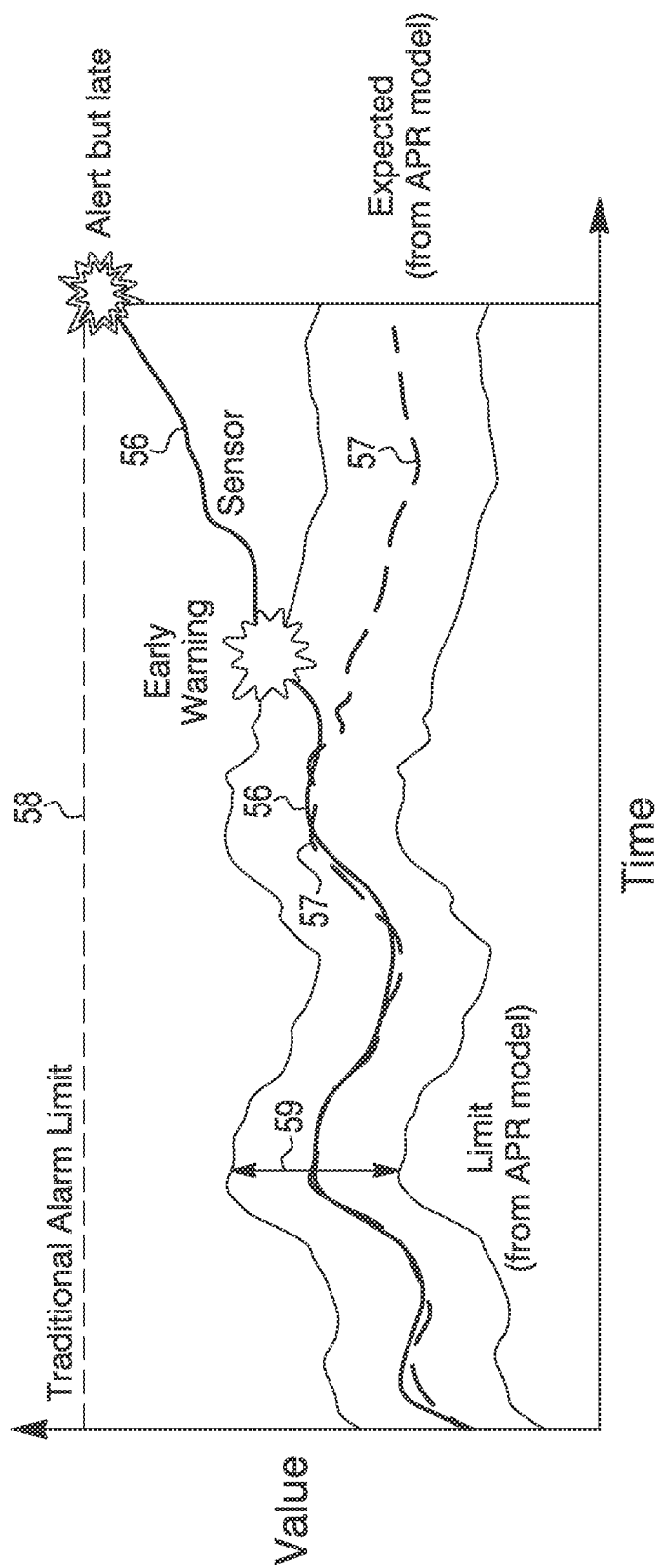
FIG. 9 is a diagram of a comparison of a detected sensor value with a model value of a sensor.

Machine learning (ML) may be a tool for automated monitoring of industrial assets. Machine learning works by using statistical techniques to identify patterns in data. For instance, advanced pattern recognition (APR) may be one technique that is used to identify equipment and sensor faults in industrial settings. APR may use historical time-series observations taken from a number of conventional point sensors (such as, for flow measurements, temperatures, static pressures, and so on, as well as advanced sensors such as acoustic and video) and combine them into a multidimensional vector of observations in time. These observation vectors are combined into a matrix, and a nonlinear pattern recognition operator is be applied to this matrix in a process analogous to matrix inversion. The result of this computation may be used similarly to a look-up table in order to predict the value of an observation based on the other measurements. FIG. 9 is a diagram that shows an example of a measured process signal (solid line 56) and the predicted or expected APR value (dashed line 57). An alarm may be issued when line 56 crosses an alarm limit 58 if the predicted measurements differ too much from the actual measurements. A spread 59 shows a tolerance of solid line 56 relative to the expected value of the APR model before it sets off an early warning indication.

APR models may be evaluated based on: 1) whether or not a fault is detected; and 2) if one is detected, how long it takes to detect said fault. For some data, for example, a fault may be defined as an alarm that is sustained for a certain amount of time. An alarm may be defined as an observation that has residual with a value greater than some statistical measure from the predicted value. Other definitions may be used for faults and alarms.

Figure 7:
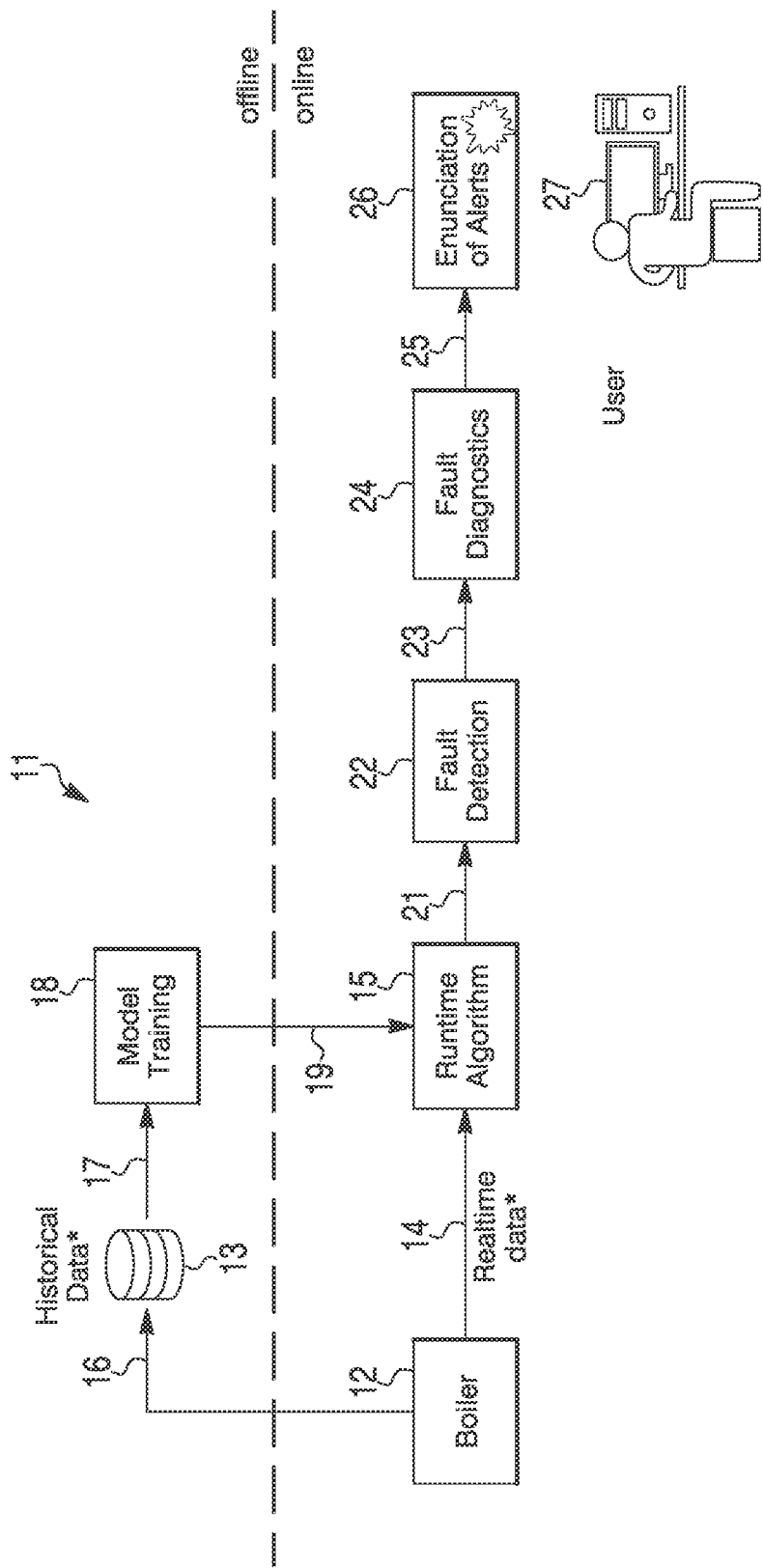
FIG. 7 is a diagram of a flame analytics system.

FIG. 7 is a diagram 11 of a flame analytics system. A boiler 12 may have sensors on it to provide real-time data, and historical data that may be saved in a memory 13. Real-time data along line 14 may go to a runtime algorithm module 15. Real-time data may be from sensors which may provide an operational state, firing state, readings from sensors for temperature, pressure, flow, percentage of valve opening, oxygen and other parameters at boiler 12. Data from the boiler 12 may be conveyed via line 16 to historical database 13. Model training module 18 may receive data from database 13 via line 17.

Run-time algorithm module 15 receives the real-time data from line 14 and model training information from module 18 via line 19. Data base 13 and model training module 18 may be regarded as offline components, while boiler 12 and run-time algorithm module 18 may be regarded as online components.

Additional sensing may include that of visual images and sound from boiler 12. Sensor components may include cameras and microphones. System 11 may incorporate leveraging machine learning for monitoring flame and anomaly detection.

Proof of concept can be implemented to evaluate and compare achievable performance (e.g., true and false positive rates) under a variety of situations such as normal operation, plugged burners, hotspots, and so forth.

An output on line 21 from algorithm module 15 may go to a fault detection module 22 that deciphers faults from the algorithm output that synthesizes and compares the real-time data with the model training information based on the historical data. Detected faults may be output from fault detection module 22 on line 23 to a fault diagnostics module 24, where the detected faults may be analyzed and diagnosed so as to pinpoint a cause or root of the faults, and determine possible ways for resolving the faults with an output on line 25 to an enunciator 26 that provides alerts to a viewer or user 27 of system 11. The user may be responsible for issuing maintenance, fix and change orders, among other items, to resolve the alerts.

Figure 8:
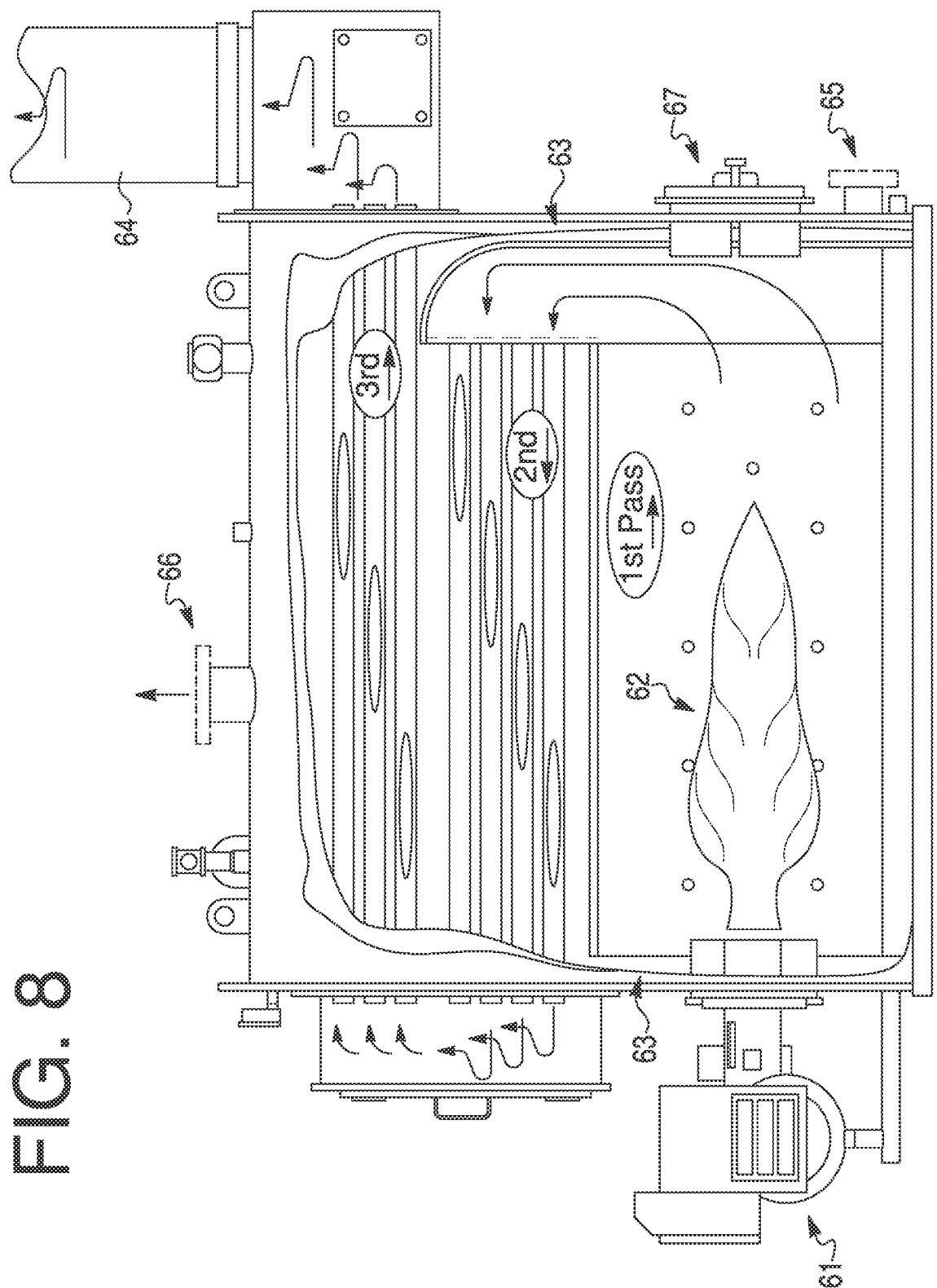
FIG. 8 is a diagram showing a cutaway of boiler that may be incorporated in the present system.

The FIG. 8 is a diagram showing a cutaway of example boiler 12. It may be for industrial or non-industrial applications. Some of the components of the boiler may include a force draft burner 61 for providing a flame 62, a water heating structure 63, flue gas outlet 64, return nozzle 65, discharge nozzle 66, and an inspection man way with a flame site port 67 for viewing flame 62. One is not necessarily limited to monitoring industrial or residential boilers. The present system may be applied to any situation with a flame and a process (e.g., furnace, kiln, and so on).

A stack level of software may involve a sensor, for instance, a hardware device with some embedded software for measuring/detecting and transmitting data (e.g., temperature, pressure, motion). The software type may be embedded, such as software that runs in a device/unit (e.g., firmware). The present system may have an IoT (Internet of Things) component.

Data from the burner system (mounted to continuously operating gas/air fired boiler) may incorporate: 1) First out; 2) Control state; 3) Firing rate; 4) Fuel consumption; 5) Steam pressure; 6) O2 level in the stack; 7) Stack temperature; 8) Flame state; 9) Flame strength; 10) Lockout status; 11) Interlock status; 12) Limit status; 13) Rate limit status; 14) Rate source; 15) Cycle count; and 16) Run time.

Trending may incorporate: 1) Steam pressure; 2) Fuel Rate; 3) Flame strength; 4) Control state; 5) O2 level; 6) Firing rate; 7) Lockout status; 8) Limit status; 9) Stack temperature; and 10) Flame state.

One may sample virtually all of the signals, process parameters, data, data points, and the like over various protocols, such as, for example, Modbus every 10 seconds or other durations.

Items in the off line/on line portion of FIG. 7 highlighted with an "*" may be data via lines 16 and 14, respectively, that can (potentially) be influencing or measuring the burner flame appearance. A) Firing rate and fuel consumption may both be used to calculate actual fuel flow. Firing rate may be expressed at a percentage of maximum firing rate of that particular appliance; so the appliance modulation range may be, for instance, a firing rate of 10 percent to 100 percent. Fuel consumption may have two forms: 1) Totalized consumption (e.g., in cubic meters, or converted to, e.g., mega joules using known gas calorific value); or 2) Actual gas flow, e.g., in cubic meters per hour, or converted to, e.g., kilowatts, using a known gas calorific value. B) Flame state may be either on/off. C) Flame strength may be the mV value of the signal being picked up by the UV flame scanner To recap, a flame analytics system may incorporate a burner, one or more sensors at the burner, a historical database connected to the one or more sensors, a model training module connected to the historical database, and a runtime algorithm module connected to the one or more sensors and the model training module. The runtime algorithm may compare realtime data from the one or more sensors and the historical data from the model training module in accordance with a machine learning algorithm.

The flame analytics system may further incorporate a fault detection module connected to the runtime algorithm module, a fault diagnostics module connected to the fault detection module, and an enunciator connected to the fault detection module.

The one or more sensors may incorporate having video or acoustic sensitivity of combustion in the burner.

The historical database and the model training module may operate offline. The runtime algorithm module, fault detection module, fault diagnostics module and enunciator may operate online.

The burner may be an integral part of an industrial furnace.

The flame analytics system may further incorporate a processor for trending one or more parameters selected from a group comprising steam pressure, fuel rate, flame strength, control state, O2 level, firing rate, lockout status, limit status, stack temperature, and flame state. One or more sensors at or about the burner may be selected for detecting one or more parameters selected from a group comprising a presence of a flame, an absence of a flame, a quantitative measure of a strength of a flame, first out, control state, firing rate, fuel consumption, steam pressure, O2 level in the stack, stack temperature, flame state, flame strength, lockout status, interlock status, limit status, rate limit status, rate source, cycle count, and run time.

Data distinguished by the runtime algorithm may incorporate one or more factors of a group consisting of flame shape, flame size, hot spots, spectra for CO2, water vapor, UV, IR, visible light flame fluctuations, operational state, firing rate, temperature, pressure, flow rate, value percentage opening, O2, stability of flame, burner nozzle condition, flame-out safeguard, and flame categorization.

The flame analytics system may further incorporate two or more video sensors having 2D views at different angles of a flame in the burner. The 2D views may be reconstructed into 3D views for observation of the flame to distinguish individual flames from one another in a multi-burner application or to distinguish a flame from its background. The 3D views of a flame may be processed to perform one or more analyses as selected from a group comprising measuring flame size, characterizing flame shape, detecting hot spots, detecting oscillations, fluctuations or flicker, and measuring a fundamental frequency of the flame.

Flame video analytics may be combined with an audio signal from a microphone located to sense an audio signal from the flame.

A flame analytics system of burners may incorporate combustion sensors positioned for obtaining runtime data about a burner, and a data acquisition mechanism connected to the combustion system for processing by a machine learning algorithm of the runtime data. The machine learning algorithm may receive historical data about the burner from a database, and the runtime data from the combustion sensors. The historical data and the runtime data about the burner may be compared to seek and detect burner faults.

Predictions about functionality of the burner may be made based on the detected burner faults.

The machine learning mechanism may incorporate a machine learning model. The machine learning model may incorporate an air side submodel, a fuel side submodel, and a combustion submodel.

The air side submodel may incorporate at least air flows and air pressures. The fuel side submodel may incorporate at least fuel flows and fuel pressures. The combustion submodel may incorporate at least a ratio of air and fuel flows.

The combustion submodel may further incorporate video data provided by one or more video sensors of a combustion process of the burner.

Video data may be post-processed before being sent to the machine learning model. An image of the post-processed video may be automatically segmented in that the image is binarized using a combination of pixel values in each color channel, and a resulting binary image being divided into adjacent geometric regions. A statistical measure between the pixel values in each color channel may be created for each segment of the image. Statistical measures may go to the combustion submodel of the machine learning model.

The combustion submodel may further incorporate acoustics data provided by one or more sound sensors detecting sounds of a combustion process in the burner.

Acoustic data may be post-processed before being sent to the machine learning model. A raw acoustic signal of acoustic data may be measured. A frequency space transform may be applied to the raw acoustic signal. A spectral centroid may be extracted from the frequency space transform. The spectral centroid may represent a center-of-mass of a frequency spectrum. The center-of-mass may contain information about the combustion process.

A combustion evaluation approach may incorporate reading data from one or more sensors of a combustion system, sending the data to a data acquisition system for machine learning processing, obtaining results from the data acquisition system, and tuning the combustion system according to the results. The combustion system may be dynamically tuned for an optimal air-fuel ratio to compensate for air-fuel ratio drift.

The data from the one or more sensors to the data acquisition system may be real time data. The data from the one or more sensors to the data acquisition system may be stored as historical data in a database. Model training may place the historical data into machine learning models. A runtime algorithm may compare the runtime data with the machine learning models to note differences between the runtime data and data of the machine learning models.

The machine learning models may use advanced pattern recognition to note deviations between the runtime data and the data of the machine learning models.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A flame analytics system, comprising:
   a burner;
   one or more sensors at or about the burner, wherein the one or more sensors include two or more video sensors positioned at different angles with respect to a flame in the burner, and wherein the two or more video sensors are configured to capture video data pertaining to the flame, wherein the video data comprise 2D views of the flame;
   a processor configured to:
   reconstruct the 2D views of the flame into 3D views of the flame, wherein the 3D views of the flame are utilized to distinguish the flame from a background of the flame in the video data, and
   determine one or more parameters associated with the flame based on the 3D views of the flame;
   a historical database connected to the one or more sensors;
   a model training module connected to the historical database, wherein a machine learning algorithm is trained based on the historical database; and
   a runtime algorithm module connected to the one or more sensors and the model training module, wherein the runtime algorithm module compares real time data from the one or more sensors and the historical data from the model training module in accordance with the machine learning algorithm.

2. The flame analytics system of claim 1, further comprising:
   a fault detection module connected to the runtime algorithm module; and
   a fault diagnostics module connected to the fault detection module; and
   an enunciator connected to the fault detection module, wherein a burner fault is detected based on the comparison between the real time data and the historical data.

3. The flame analytics system of claim 2, wherein:
   the historical database and the model training module operate offline; and
   the runtime algorithm module, the fault detection module, the fault diagnostics module and the enunciator operate online.

4. The flame analytics system of claim 1, wherein the one or more sensors comprise a microphone configured to sense sound generated by the flame.

5. The flame analytics system of claim 1, wherein the burner is associated with an industrial furnace.

6. The flame analytics system of claim 1,
   wherein the one or more parameters associated with the flame comprise one or more of steam pressure, fuel rate, flame strength, control state, $O_2$ level, firing rate, lockout status, limit status, stack temperature, and flame state, wherein the one or more sensors at or about the burner are selected for detecting one or more of a presence of the flame, an absence of the flame, a quantitative measure of a strength of the flame, first out, the control state, the firing rate, the steam pressure, the $O_2$ level, the stack temperature, the flame state, the flame strength, the lockout status, the limit status, fuel consumption, interlock status, rate limit status, rate source, cycle count, and run time.

7. The flame analytics system of claim 1, wherein the 3D views distinguish the flame from other flames in a multi-burner appliance, and wherein the one or more parameters determined from the 3D views of the flame comprise a flame size, characterizing flame shape, hot spots, oscillations, fluctuations or flicker, and a fundamental frequency of the flame.

8. The flame analytics system of claim 1, wherein flame video analytics are combined with an audio signal from a microphone located to sense sound generated by the flame.

9. The flame analytics system of claim 1, wherein data distinguished by the runtime algorithm module comprises one or more of flame shape, flame size, hot spots, spectra for $CO_2$, water vapor, UV, IR, visible light flame fluctuations, operational state, firing rate, temperature, pressure, flow rate, value percentage opening, $O_2$, stability of the flame, burner nozzle condition, flame-out safeguard, and flame categorization.

10. The flame analytics system of claim 9, wherein flame video analytics are combined with data corresponding to one or more of the flame shape, the flame size, the hot spots, the spectra for $CO_2$, the water vapor, the UV, the IR, the visible light flame fluctuations, the operational state, the firing rate, the temperature, the pressure, the flow rate, the value percentage opening, $O_2$, the stability of the flame, the burner nozzle condition, the flame-out safeguard, and the flame categorization.

11. A method, for detecting a burner fault, comprising:
obtaining runtime data of a burner from combustion sensors associated with the burner;
processing the runtime data by a machine learning mechanism, wherein the machine learning mechanism receives historical data of the burner from a database, and the runtime data, wherein the machine learning mechanism comprises a machine learning model, the machine learning model comprises an air side submodel; a fuel side submodel, and a combustion submodel, wherein the combustion submodel further incorporates video data provided by one or more video sensors of a combustion process of the burner, wherein the video data are post-processed before being sent to the machine learning model, wherein an image of the post-processed video is automatically segmented in that the image is binarized using a combination of pixel values in each color channel, and a resulting binary image being divided into adjacent geometric regions, wherein a statistical measure between the pixel values in each color channel is created for each segment of the image, and wherein statistical measures are input to the combustion submodel of the machine learning model; and
comparing the historical data and the runtime data of the burner to detect the burner fault.

12. The method of claim 11, further comprising:
predicting functionality of the burner based on the detected burner fault.

13. The method of claim 11, wherein:
the air side submodel incorporates at least air flows and air pressures;
the fuel side submodel incorporates at least fuel flows and fuel pressures; and
the combustion submodel incorporates at least a ratio of air and fuel flows.

14. The method of claim 11, wherein the combustion submodel further incorporates acoustic data provided by one or more sound sensors detecting sounds of a combustion process in the burner, and wherein:
the acoustic data is post-processed before being sent to the machine learning model;
a raw acoustic signal of acoustic data is measured;
a frequency space transform is applied to the raw acoustic signal;
a spectral centroid is extracted from the frequency space transform;
the spectral centroid represents a center-of-mass of a frequency spectrum; and
the center-of-mass includes information of the combustion process.

15. A method, comprising:
reading sensor data from one or more sensors of a combustion system;
reading video data capturing a flame of the combustion system from one or more video sensors, wherein the video data comprises at least 2D views of the flame, wherein the 2D views of the flame are reconstructed into 3D views of the flame to distinguish the flame from a background of the flame in the video data, and wherein one or more parameters associated with the flame are determined based on the 3D views of the flame;
sending the sensor data and the video data to a data acquisition system for machine learning processing, wherein the video data comprises at least the one or more parameters associated with the flame;
obtaining results from the data acquisition system; and
tuning the combustion system based on the results.

16. The method of claim 15, wherein the combustion system is dynamically tuned for an optimal air-fuel ratio to compensate for air-fuel ratio drift.

17. The method of claim 15, wherein:
the sensor data from the one or more sensors and the video data from the one or more video sensors are real time data;
the sensor data from the one or more sensors and the video data from the one or more video sensors are stored as historical data in a database;
model training places the historical data into machine learning models; and
a runtime algorithm compares the real time data with the machine learning models to note differences between the real time data and data of the machine learning models.

18. The method of claim 17, wherein the machine learning models determine deviations between the real time data and the data of the machine learning models, based on advanced pattern recognition.

* * * * *